United States Patent [19]
Minerbo

[11] Patent Number: 6,023,168
[45] Date of Patent: Feb. 8, 2000

[54] APPARATUS AND METHOD FOR MEASURING THE RESISTIVITY OF UNDERGROUND FORMATIONS

[75] Inventor: Gerald Nelson Minerbo, Missouri City, Tex.

[73] Assignee: Schlumberger Technology Corporation, Ridgefield, Conn.

[21] Appl. No.: 08/518,403

[22] Filed: Aug. 21, 1995

[51] Int. Cl.[7] .................................................. G01V 3/20
[52] U.S. Cl. ........................................ 324/373; 324/366
[58] Field of Search .................................. 324/373, 374, 324/375, 366, 371

[56] References Cited

U.S. PATENT DOCUMENTS

| | | | |
|---|---|---|---|
| 3,256,480 | 6/1966 | Runge et al. ............................. | 324/10 |
| 3,262,050 | 7/1966 | Threadgold et al. .................... | 324/375 |
| 3,772,589 | 11/1973 | Scholberg ................................ | 324/10 |
| 4,675,610 | 6/1987 | Chapman et al. ....................... | 324/366 |
| 4,675,611 | 6/1987 | Chapman et al. ....................... | 324/366 |
| 4,677,385 | 6/1987 | Chapman et al. ....................... | 324/366 |
| 4,677,386 | 6/1987 | Chapman et al. ....................... | 324/366 |
| 5,210,691 | 5/1993 | Freedman et al. ...................... | 364/422 |
| 5,343,153 | 8/1994 | Davies et al. ............................ | 324/366 |

FOREIGN PATENT DOCUMENTS

| | | | |
|---|---|---|---|
| 2 283 324 | 5/1995 | United Kingdom ............. | G01V 3/20 |

OTHER PUBLICATIONS

D. V. Ellis, "Well Logging for Earth Scientists", *Elsevier*, 1987, pp. 84–97, is cited in the specification and describes a laterolog technique which comprises making a measurement with a tool having a current emitting electrode and voltage electrodes on either side thereof which are operated to force current into the formation.

H. G. Doll, "The Laterolog: A New Resistivity Logging Method with Electrodes Using an Automatic Focusing System", *Petroleum Transactions, AIME*, vol. 192, 1951, pp. 305–316 is cited in the specification and describes the simplest laterolog electrode tool—the Laterolog–3.

*Primary Examiner*—Walter E. Snow
*Attorney, Agent, or Firm*—William B. Batzer

[57] ABSTRACT

A method for measuring formation resistivity uses a tool including a central current electrode and a series of voltage electrodes arranged in pairs on either side of the current electrode. A series of measurements is made using the current electrode with different numbers of pairs of voltage electrodes maintained at a predetermined voltage so as to allow resistivity in the formation to be determined with different depths of investigation. In this manner these measurements are focused and are relatively unaffected by the borehole or by adjacent layers in the formation. The central current electrode is segmented azimuthally into a series of electrodes, and the current flowing out of each azimuthal segment is measured separately. This can yield resistivity images of the formation surrounding the borehole. The azimuthal imaging capability can be used for stratigraphic or lithologic analysis of the formation and to detect fractures in the rock. The three-dimensional imaging capability can be used in deviated wells or horizontal wells to detect asymmetric invasion, or to locate a bed boundary close to the borehole.

10 Claims, 12 Drawing Sheets

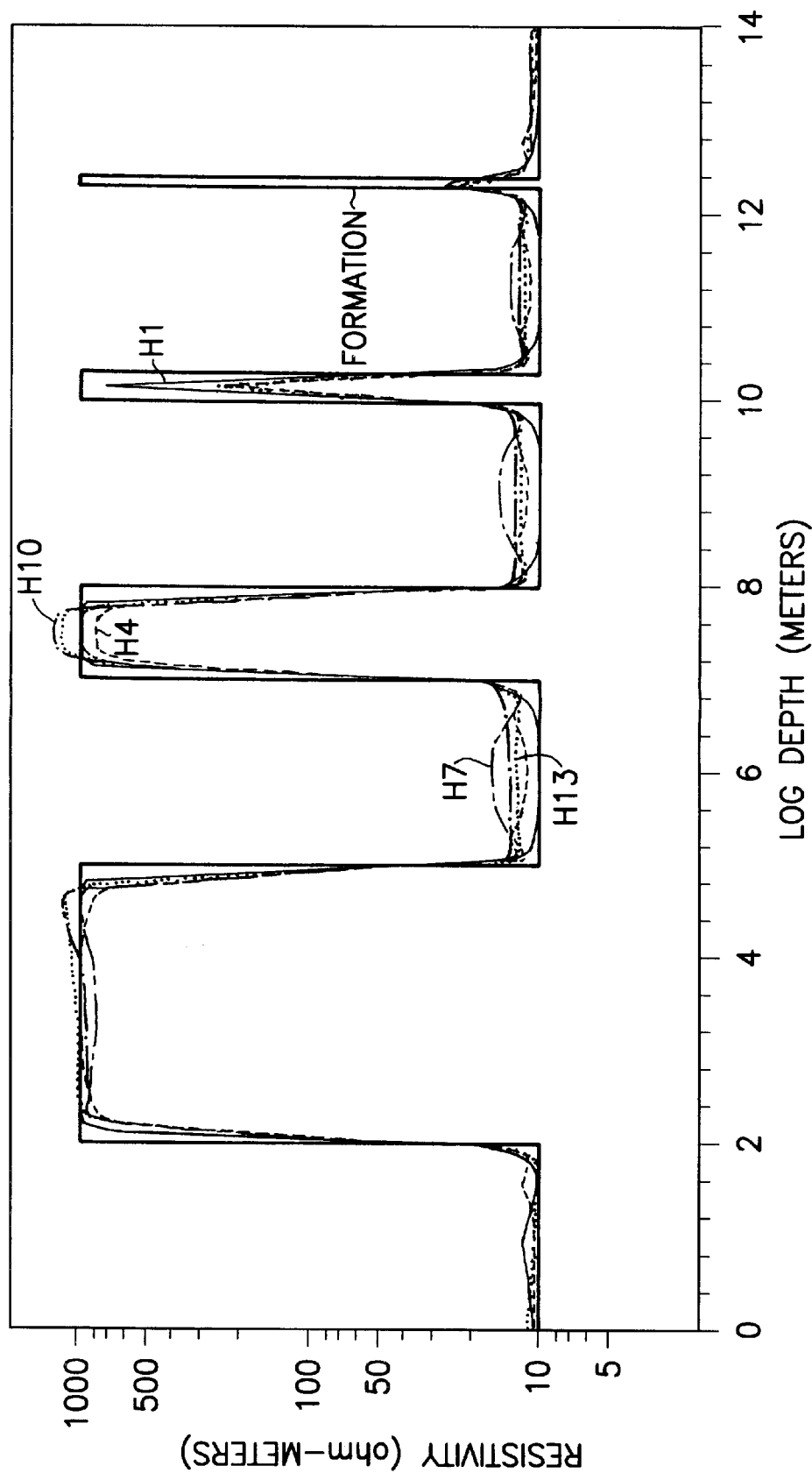

RADIUS (INCHES)

RADIUS (INCHES)

APPARATUS AND METHOD FOR MEASURING THE RESISTIVITY OF UNDERGROUND FORMATIONS

FIELD OF THE INVENTION

The present invention relates to resistivity logging of underground formations from a borehole. In particular, the invention provides apparatus and methods for making resistivity measurements at different distances into the formation from the borehole, and for obtaining three-dimensional images of the resistivity in the formation near the borehole.

BACKGROUND OF THE INVENTION

Resistivity measurements of underground formations from within a borehole have been made by a number of techniques. The laterolog technique comprises making a measurement with a tool having a current emitting electrode and voltage electrodes on either side thereof which are operated to force current into the formation, and is described in Well Logging for Earth Scientists, D. V. Ellis, Elsevier, 1987, pp 84–97. The simplest laterolog electrode tool is the Laterolog-3 described by H.-G. Doll in AIME Petroleum Transactions, vol. 192, pp 305–396 (1951). The Laterolog-3 comprises a central current electrode with a single voltage electrode on either side thereof. The current electrode and the voltage electrodes are all held at a predetermined voltage, and the survey current flowing into the formation from the central current electrode is measured. A more advanced form of the laterolog has further monitoring electrodes on either side of the current emitting electrode, and provide further voltage source electrodes to prevent current flow along the borehole and to focus the survey current deeper into the formation. Such laterologs include monitor electrodes to sense any current flow in the borehole and provide feedback signals to control the voltage applied to the voltage source electrodes and so actively focus the current in the formation.

A further development of the laterolog is described in U.S. Pat. No. 5,343,153 and shown in FIG. 1. This tool comprises a tool body 10 having a current source electrode 14, voltage electrodes 16, and monitor electrodes 18. The current source electrode 14 is divided azimuthally into a series of azimuthal electrodes Az. In use, a current is injected into the formation from the current electrode 14 while the voltage electrodes 16 are maintained at a voltage sufficient to prevent current flow from the current electrode 14 along the borehole 20. The voltage necessary to achieve this condition is determined by measuring the voltage drop between the monitoring electrodes 18 and using this voltage drop in a feedback system to control the voltage applied to the voltage electrodes 16. The current flowing out of electrode 14 is maintained at a predetermined level, the voltage required to do this is measured, and the resistivity of the formation is inferred from this measured voltage. Azimuthal discrimination is achieved by measuring the voltage on each azimuthal electrode Az when determining the resistivity of the formation. The survey current from the current electrode in this case is actively focused into the formation using feedback from the monitor electrodes to control the voltage electrodes. In order to force the current deeper into the formation, the return point for the current, which would otherwise be the armored covering on the wireline cable used to suspend the tool in the borehole, needs to be removed as far as possible from the head of the tool. This is achieved by the use of an insulating bridle to connect the laterolog tool to the wireline cable. The bridle has an electrically insulated outer surface with a strengthening cable in the middle of the conductor cables. This bridle provides the power to the tool and the data transmission from the tool without providing a return path for the survey current.

Other examples of actively focused laterolog tools can be found in U.S. Pat. No. 3,772,589 and in U.S. patent applications Ser. Nos. 07/974,019 and 07/974,029 now U.S. Pat. No. 5,396,175, issued Mar. 7, 1995, and U.S. Pat. No. 5,399,971, issued Mar. 21, 1995, respectively.

In other approaches to making resistivity measurements with multiple depths of investigation, a current is passed into the formation and voltage is measured at various locations in the borehole spaced from the current electrodes using an array of measurement electrodes, see for example U.S. Pat. No. 3,256,480, U.S. Pat. No. 4,675,610, U.S. Pat. No. 4,675,611, U.S. Pat. No. 4,677,385 and U.S. Pat. No. 4,677,386. These unfocused electrode measurements are strongly influenced by the borehole and would be difficult to interpret. Also the unfocused electrode measurements would be difficult to interpret in a thin resistive layer sourrounded by conductive shoulders.

It is an object of the invention to provide a tool with multiple depths of investigation where individual measurements are focused.

SUMMARY OF THE INVENTION

In accordance with a first aspect of the invention, there is provided a method for measuring formation resistivity using a tool comprising a central current electrode and a series of voltage electrodes arranged in pairs on either side of the current electrode. It is preferred to make a series of measurements with different numbers of pairs of voltage electrodes maintained at the predetermined voltage so as to allow resistivity in the formation to be determined with different depths of investigation. In this manner these measurements are focused and are relatively unaffected by the borehole or by adjacent layers in the formation.

In a preferred embodiment, to provide azimuthal discrimination, the central current electrode is segmented azimuthally into a series of electrodes, and the current flowing out of each azimuthal segment is measured separately. This can yield resistivity images of the formation surrounding the borehole. The azimuthal imaging capability can be used for stratigraphic or lithologic analysis of the formation and to detect fractures in the rock. The three-dimensional imaging capability can be used in deviated wells or horizontal wells to detect asymmetric invasion, or to locate a bed boundary close to the borehole.

A second aspect of the invention provides a borehole logging tool having disposed thereon a current electrode and a series of voltage electrodes on either side thereof. Means are provided for maintaining the current electrode and consecutive pairs of adjacent voltage electrodes at the predetermined voltage, while allowing current to flow out of the current electrode into the formation. Means are also provided for measuring, for each voltage energization pattern, the current flowing out of each azimuthal segment of the current electrode. Further means are also provided to determine the distribution of resistivity in the formation based on these measurements.

Preferably, means are provided for applying different voltage energization patterns, wherein a different number of consecutive pairs of voltage electrodes is maintained at the predetermined voltage, so as to focus the current into the formation. By increasing the number of pairs of voltage electrodes maintained at the predetermined voltage, the current is forced deeper and deeper into the formation, and the depth of investigation is increased. The remaining voltage electrodes are kept at the same voltage as the wireline cable armor, and act as current returns. Thus the tool can make deep measurements yielding the true formation resistivity without the need for an insulating bridle.

The array tool of the invention allows making resistivity measurements in a borehole for determination of the three-dimensional distribution of resistivity in the formation.

In a preferred embodiment the central current electrode is segmented into a number of azimuthal electrodes and the current flowing out of each azimuthal segment is measured separately. The azimuthal electrodes, and the voltage electrodes are separated by electrically insulating gaps. It is particularly preferred that the gaps be as small as possible with respect to the size of the electrode while maintaining electrical isolation. This design improves the current focusing, reduces the effect of electrode contact impedance, and facilitates the analysis of the measurements based on modeling current flow. By summing the current flowing from all the azimuthal segments, the total current flowing into the formation can be obtained, giving the same results as a single current electrode. This can be useful in very resistive formations, where the individual azimuthal currents are insufficient to make an accurate determination of resistivity.

By making a series of measurements with the current being focused progressively deeper into the formation, it is possible to obtain an accurate determination of the true formation resistivity in the presence of invasion, in view of the fact that the shallow measurements permit correction of the more deeply focused currents, which have to flow through the invaded region. With this method, an accurate determination of the true formation resistivity is obtained without the necessity of using an insulating bridle. Because the current return paths are relatively short, the frequency of operation can be around 1000 Hz, which is more convenient from an engineering standpoint than the low frequencies, typically 100 Hz, commonly used for deep laterolog measurements.

The determination of resistivity at different depths of investigation can be applied to the current flowing out of each azimuthal sector, giving a three-dimensional image of resistivity in the formation.

BRIEF DESCRIPTION OF THE DRAWINGS

FIG. 6 shows a simulated log in a model formation with uninvaded thin beds showing the resistivity recorded by five channels of the thirteen channels;

FIG. 7 (b) shows the true bed resistivity and invasion resistivity in the model formation of FIG. 7 (a);

FIG. 7 (c) shows asimulated log of the resistivity recorded by five of the thirteen channels in the formation of FIG. 7 (a);

FIG. 7 (d) shows a reconstructed resistivity map obtained by processing the data collected by the array laterolog tool;

DESCRIPTION OF THE PREFERRED EMBODIMENT

Figure 1:
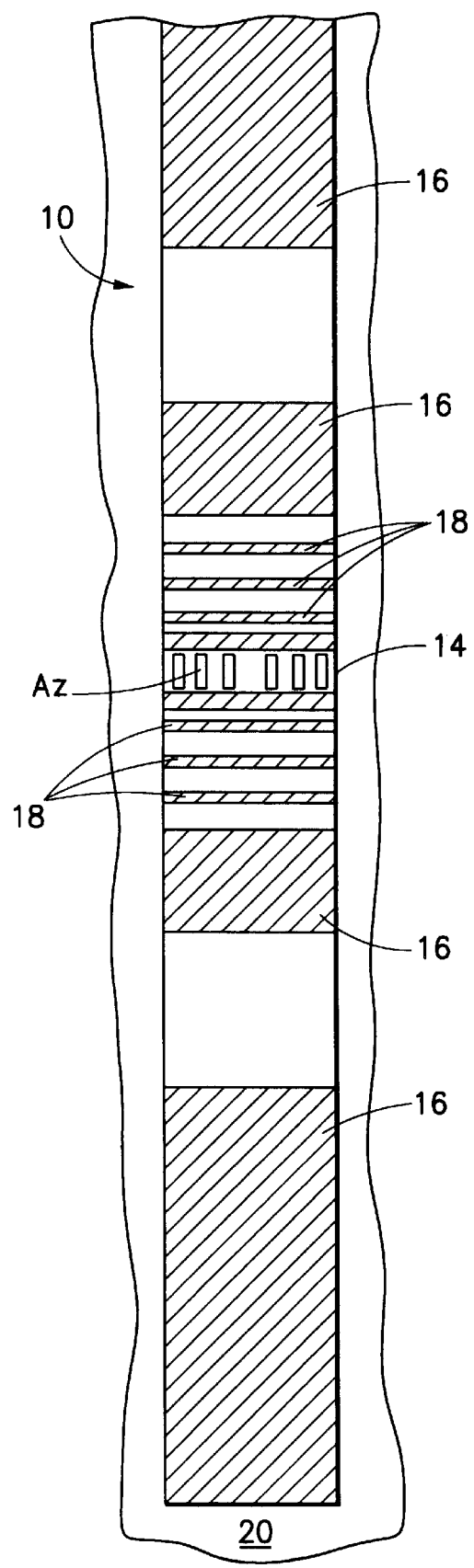
FIG. 1 shows a prior art tool.
Figure 2:
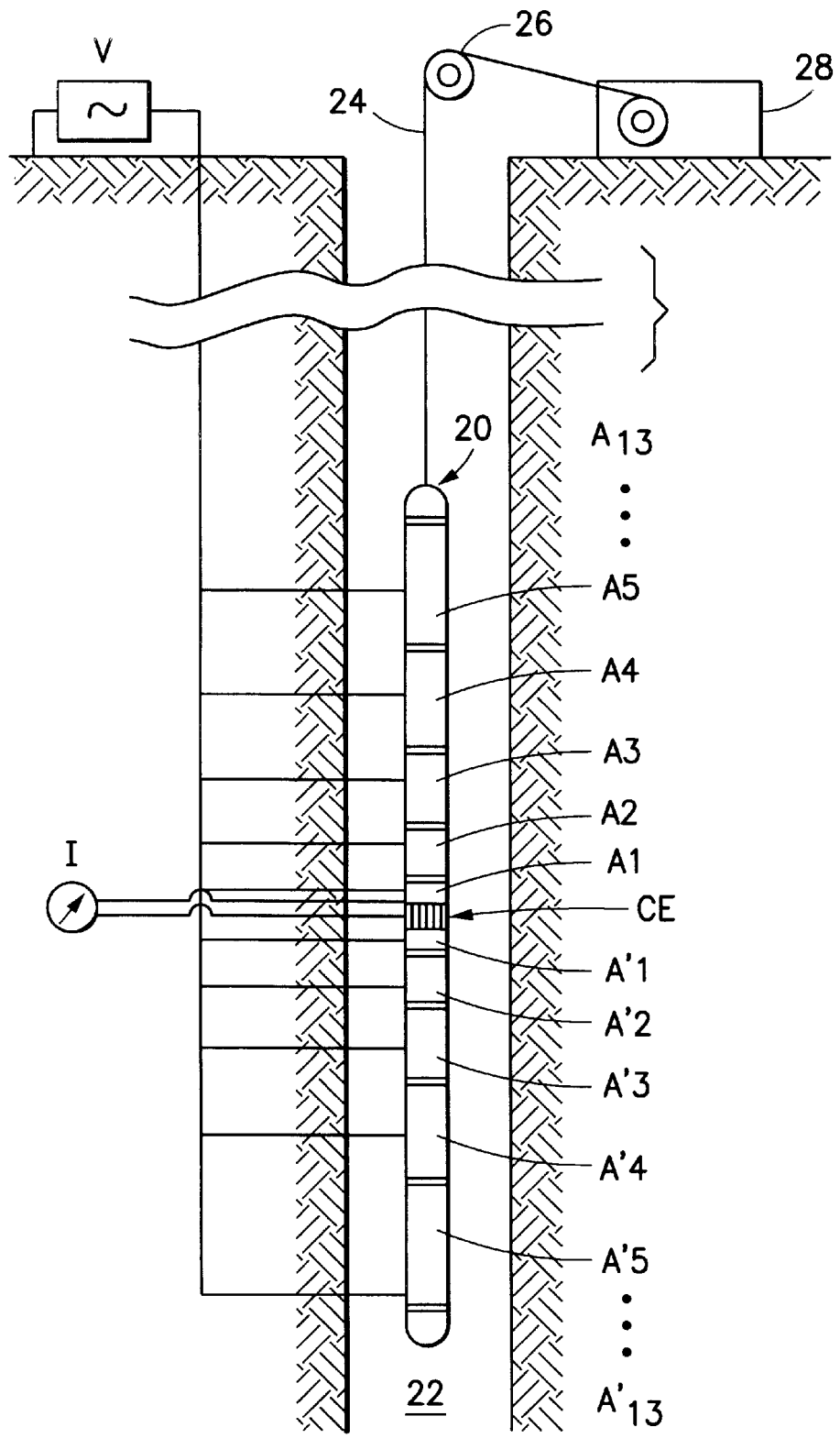
FIG. 2 shows a tool according to one embodiment of the invention.

Referring now to FIG. 2, there is shown therein a sonde 20 suspended in a borehole 22 by means of a wireline cable 24 which is connected at the surface to a winch 26 and to data acquisition and processing means 28 in the conventional manner employed in well logging.

The sonde 20 has an insulating mandrel (not shown) having disposed thereon a circular array of twelve current electrodes CE1–CE12 (not all shown) and a series of twenty-six voltage electrodes A1–A13 and A1'–-A13' (not all shown) disposed symmetrically on either side of the current electrode array. A signal source V provides a voltage to the current electrodes CE and at least to the pair of voltage electrodes A1–A1' adjacent thereto, and optionally to any number of consecutive symmetrical pairs An–An' relative to the current electrodes CE. The remaining voltage electrodes that are not energized are at ground potential (electrically connected to the wireline armor), and so act as a current return. A digital ammeter is provided to measure the current flowing into the formation from each of the current electrodes CE1–CE12.

Figure 3A:
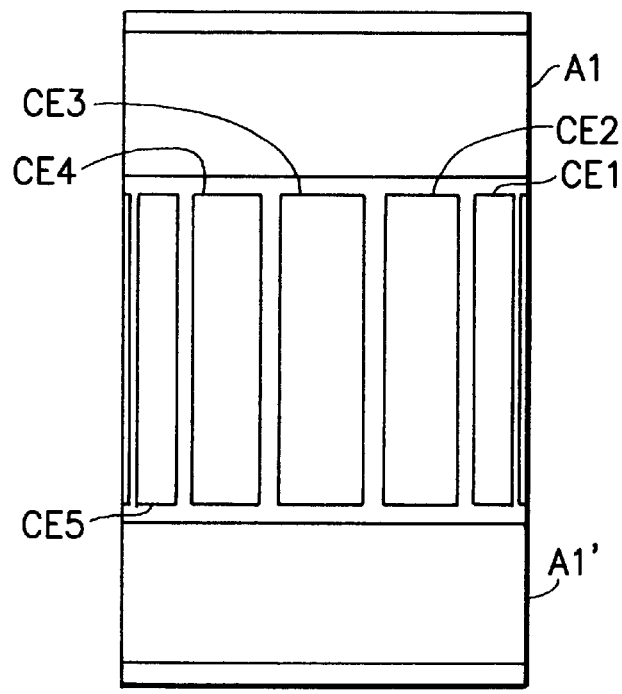
FIGS. 3 (a) and (b) show detail and cross section of the current electrode of the tool of FIG. 2.
Figure 3B:
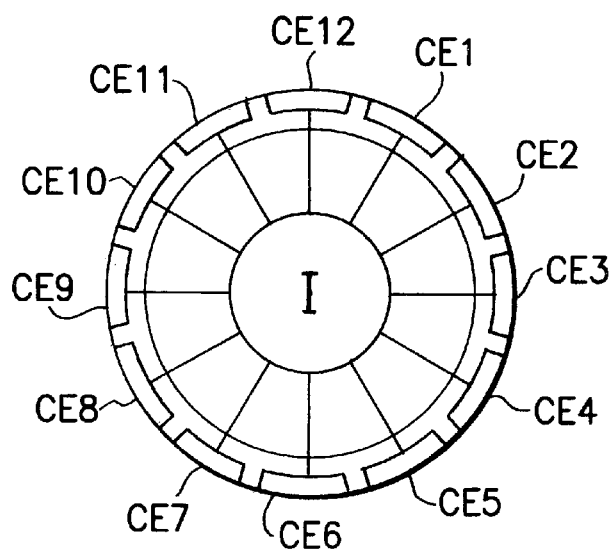
Figure 4:
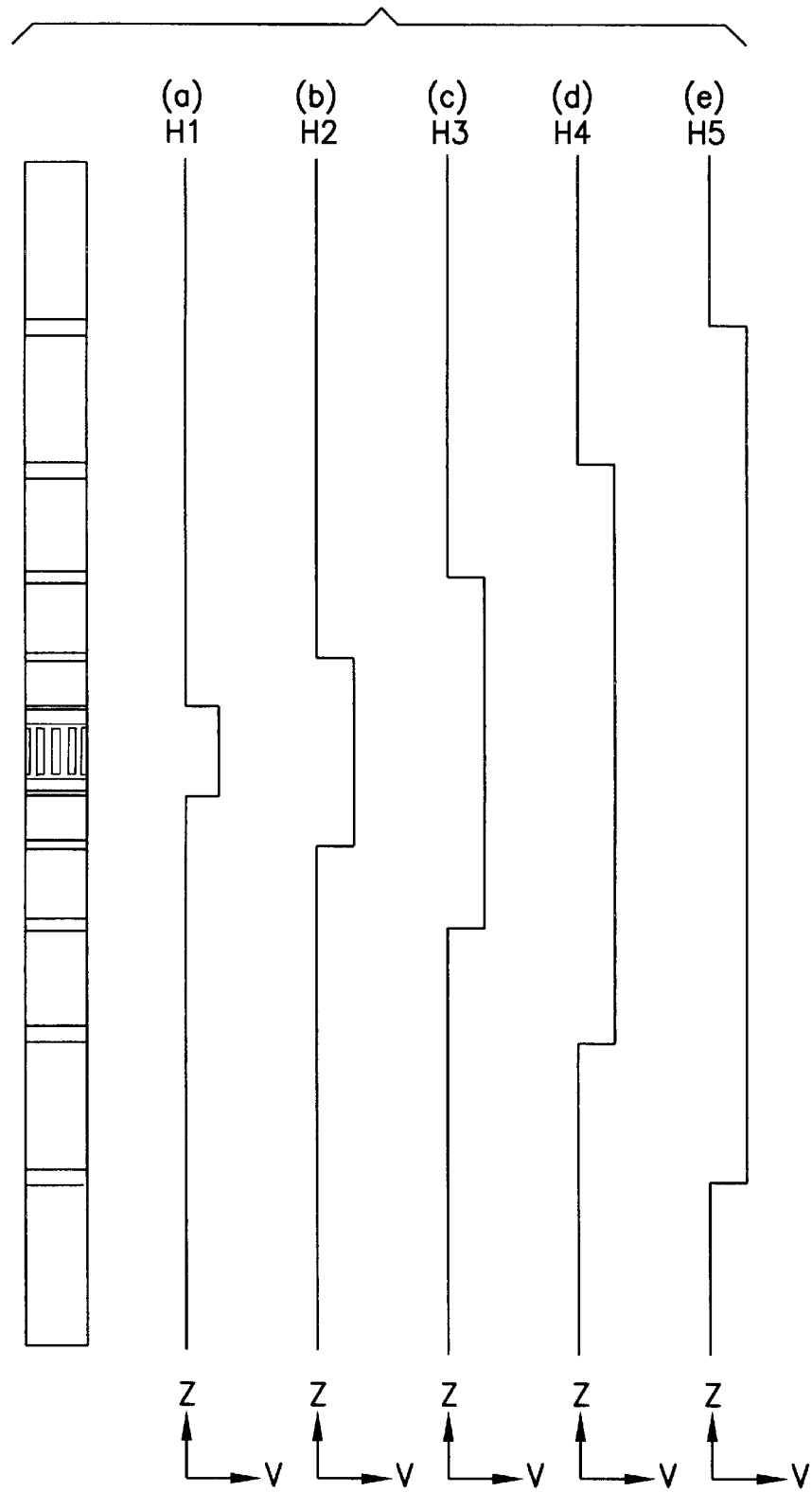
FIGS. 4 (a)–(e) shows the voltage patterns applied to obtain resistivity logs with different depths of investigation.

There are a possible thirteen different arrangements of voltage energization patterns (channels) and twelve current measurements giving a total of 156 measurements at a given location in the borehole. The twelve current electrodes CE1–CE12 provide measurements in twelve azimuthal directions, as will be evident from FIG. 3. The thirteen voltage channels permit focusing of the current to thirteen different effective depths into the formation, the more voltage electrodes energized, the deeper the current is focused into the formation. FIG. 4 shows the energization pattern of the electrodes for some of the channels (H1–H5) relative to electrode position on the tool (shown in part on the left). For channel H1, voltage electrodes A1 and A1' are energized to potential V, while A2–A13 and A2'–A13' held at zero potential. The current electrodes CE1–CE12 are always held at the same potential as A1 and A1'. For each energization pattern, the current I emerging from each of the electrodes CE1–12 is measured by a digital ammeter. The ratio V/I is indicative of the resistivity of the formation for the investigation depth and azimuthal direction selected. The resistivity data are transmitted by telemetry to the data acquisition and analysis unit 28 at the surface, where they can be displayed and stored for further processing and analysis.

Figure 5:
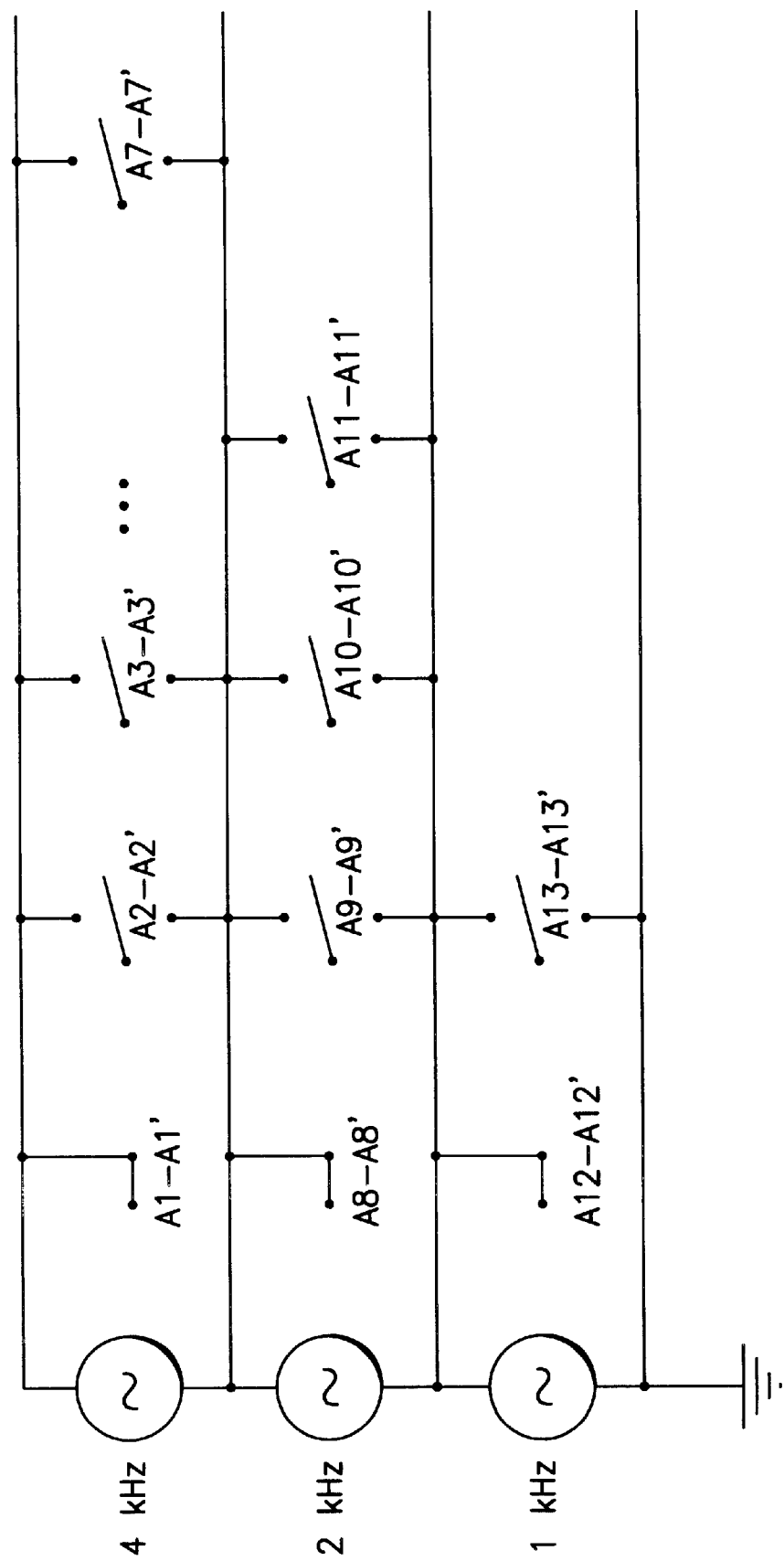
FIG. 5 shows a switching system for use in the tool of FIG. 2.
Figure 7A:
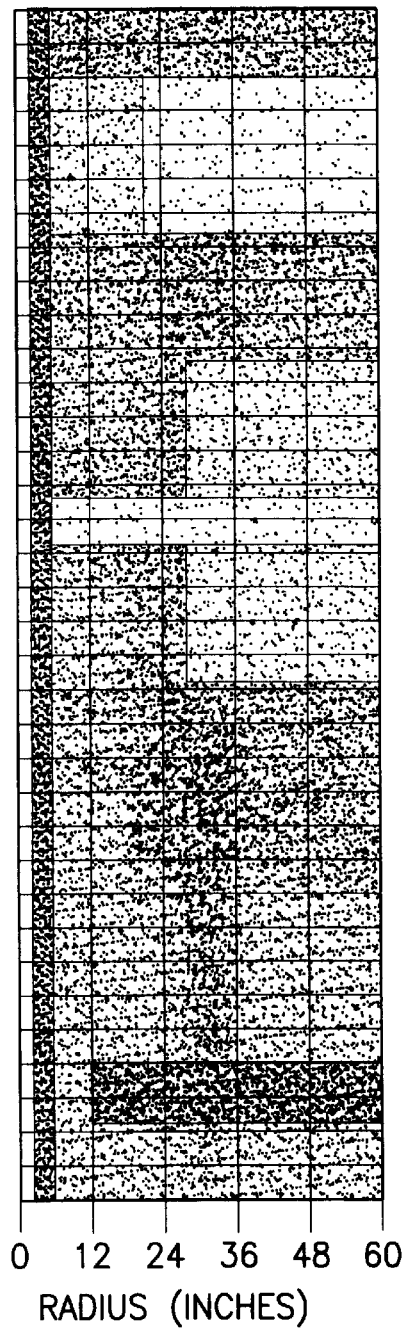
FIG. 7 (a) shows a resistivity map of a model formation with invaded thin beds.
FIG. 7(e) shows reconstructed shallow and dep resistivity values.
Figure 7D:
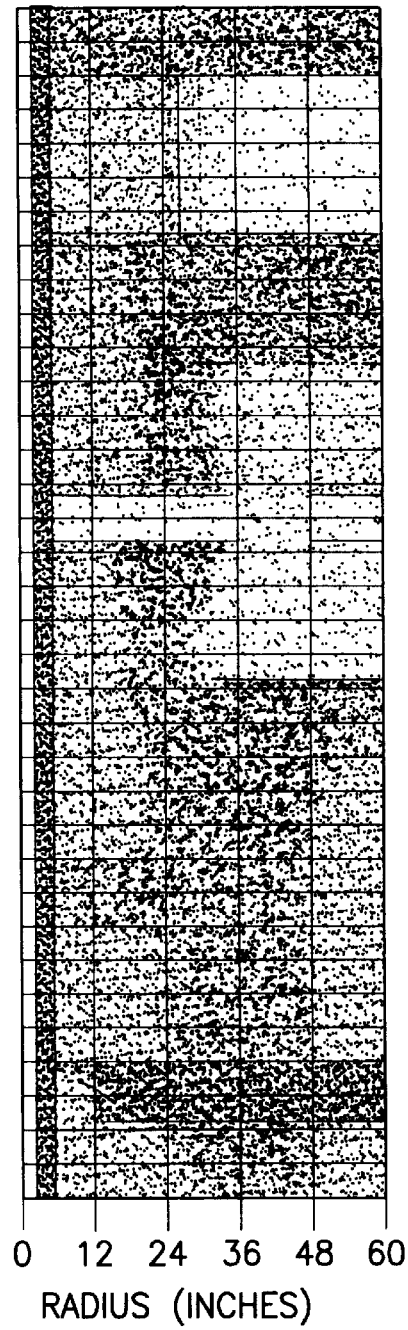
Figure 7B:
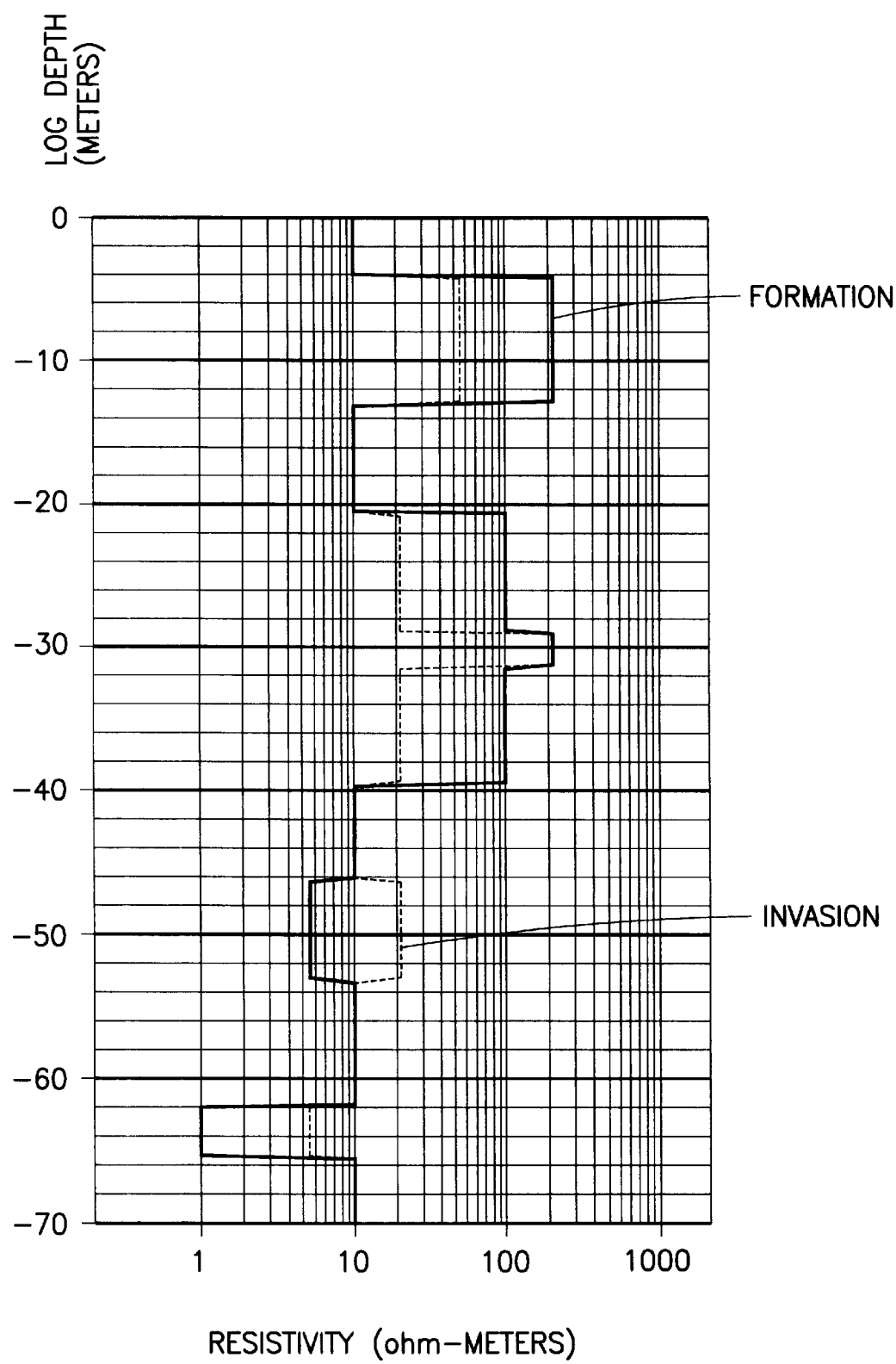
Figure 7C:
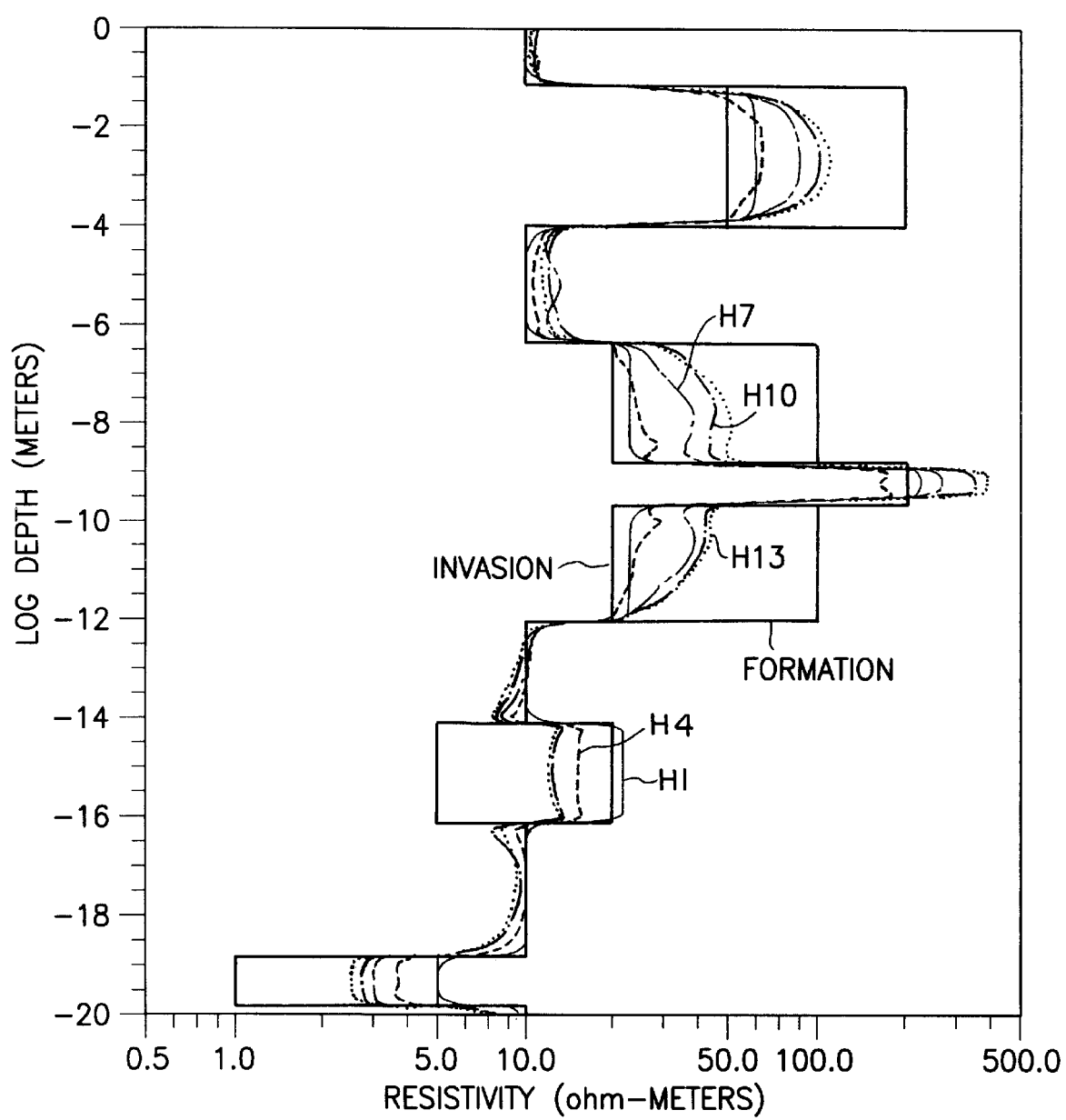
Figure 7E:
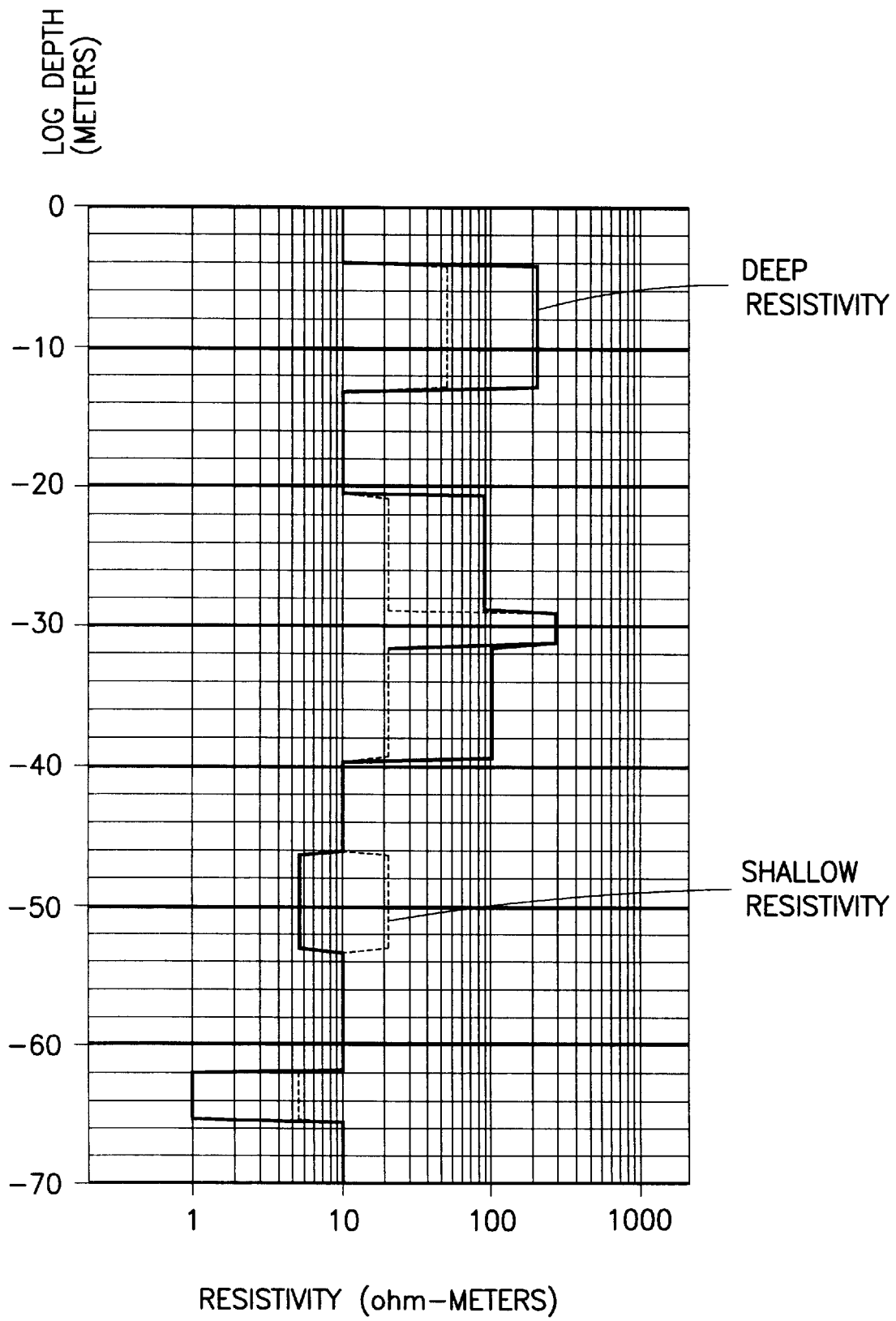

FIG. 5 shows the switch ing and multiplexing arrangement used to apply the voltage signal to the electrodes for the various channels. A 4 kHz signal is applied for channels H1–H7, a 2 kHz signal is applied for channels H8–H11 and a 1 kHz signal is applied for channels H12–H13, as is summarized in the table below. The switching arrangement is operated so that 125 cycles of signal are applied to each electrode for the respective channels allowing all channels to be sampled every 0.25 seconds. For a maximum logging speed of 0.3 meters/second, this means that all channels are sampled every 0.075 meters of log.

| | | | | | | | |
|---|---|---|---|---|---|---|---|
| 1000 Hz | | | H13 | | H12 | | |
| 2000 Hz | | H11 | H10 | | H9 | | H8 |
| 4000 Hz | H7 | H6 | H5 | H4 | H3 | H2 | H1 |

In its simplest operation, the total current flowing out of the electrode CE is recorded, i.e. there is no azimuthal discrimination. For every vertical position (zb) of the sonde in the borehole, 13 resistivity measurements (channels) (a) are recorded. To reconstruct the resistivity distribution in the formation, data from several surrounding positions of the sonde are processed simultaneously. Typically a set of measurements recorded in 3 inch steps over a 30 foot interval (121 measurement positions (zb)) are processed together, corresponding to a total of 1573 individual measurements (13*121). The formation surrounding the 30 ft section of borehole can be divided into radial cells extending 100 in into the formation, each cell being 2in deep, giving 6171 cells (i=0, . . . , 50, j=0, . . . , 120) of size 2 in×3 in for the selected 30 ft interval of the log. The individual measurements are processed on a computer to give the conductivity distribution $\sigma_{(pi,zj)}$ in each cell i,j. Resistivity (measured in units of Ohm-meters) is $1/\sigma$, the reciprocal of conductivity (measured in units of Siemens/meter).

The approach used to interpret the measured data in terms of formation conductivity is to solve equations on a computer to minimize a positive definite function (a Lagrangian L). (It will be appreciated that the following method can be implemented by means of a computer program in which some of the steps below would not be coded directly as shown. The following method represents on paper the effect of such code.) The following Lagrangian is minimized:

$$L = \sum_{a,b} [M_{a(zb)}^{TRUE} - M_{a(zb)}^{MODEL}[\sigma_{(pi,zj)}]]^2 +$$

$$\chi \sum_{i,j} [(\log\sigma_{(pi,zj)} - \log\sigma_{(pi-1,zj)})^2 + (\log\sigma_{(pi,zj)} - \log\sigma_{(pi,zj-1)})^2]$$

where $M_{a(zb)}^{TRUE}$ is the measured data value, $M_{a(zb)}^{MODEL}$ is the value for the measurement predicted by a model for a formation of estimated conductivity $\sigma$, and $$\chi \sum_{i,j} [(\log\sigma_{(pi,zj)} - \log\sigma_{(pi-1,zj)})^2 + (\log\sigma_{(pi,zj)} - \log\sigma_{(pi,zj-1)})^2]$$

is a penalty function which has the effect of penalizing large changes in a between adjacent cells. At a bed boundary, a large change in conductivity is expected. Cells near a bed boundary are omitted from the above penalty function. Bed boundaries can be identified from the raw data.

The first step is to choose an initial conductivity distribution $\sigma_{(pi,zj)}^{(0)}$. A suitable initial choice is a homogeneous medium estimate over the volume of investigation. Having found a found a value for $\sigma(pi,zj)^{(0)}$, the quantity $M_{a(zb)}^{MODEL}[\sigma_{(pi,zj)}^{(0)}]$ is computed. $M_{a(zb)}^{MODEL}$ is the predicted measurement at position (zb) for a given tool and formation conductivity $\sigma^{(0)}$. The predicted measurement value is computed by simulating electrical current flow in a medium with the assumed model conductivity distribution $\sigma^{(0)}$.

In the model calculation, one can also compute a sensitivity function $$\frac{\partial}{\partial\sigma_{(p_i,z_j)}^{(0)}} M_{a(zb)}^{MODEL}[\sigma_{(pi,zj)}^{(0)}] = \left(\vec{\nabla}\phi_{a(zb)}[\sigma_{(pi,zj)}^{(0)}]\right) \cdot \left(\vec{\nabla}\tilde{\phi}_{a(zb)}[\sigma_{(pi,zj)}^{(0)}]\right)$$

where $\phi_{a(zb)}$ is the potential in a cell (i,j) with the tool at position (zb) with the channel a electrodes energized, $\phi$ is the potential corresponding to a hypothetical measurement with only the center electrode being energized.

These computed values are combined to give:

$$newM_{a(zb)}^{MODEL} = M_{a(zb)}^{MODEL}\left[\sigma_{(p_i,z_j)}^{(0)} + \frac{\partial}{\partial\sigma_{(p_i,z_j)}^{(0)}} M_{a(zb)}^{MODEL}[\sigma_{(p_i,z_j)}^{(0)}] * \left(\sigma_{(p_i,z_j)}^{(1)} - \sigma_{(p_i,z_j)}^{(0)}\right)\right]$$

The new estimate of $M_{a(zb)}^{MODEL}$ is expressed in terms of the previous $M_{a(zb)}^{MODEL}$, the sensitivity function, and the difference between the new estimate of the conductivity $\sigma^{(1)}$, and the previous estimate. These relations give a 6171×6171 system of of linear equations which are solved in the computer for the new conductivity estimate $\sigma^{(1)}$. The process is repeated until a satisfactory match to the measured data has been obtained. The updated value of the conductivity estimate in each cell gives the distribution of conductivities in the formation for the selected interval of the log. The same general interpretation method is used when a series of azimuthal measurements is obtained, in which case the number of cells is increased and the conductivity estimates take into account the azimuthal angle as well as vertical position in the formation and radial distance from the borehole.

The value determined for the conductivity of each cell can be represented by a color and/or gray density on a reconstructed image indicating the resistivity distribution around the borehole. This in turn allows characterization of the formation, including, inter alia, the determination of the extent of invasion. The invasion profile in the radial direction can be determined but with limited resolution because the number of available channels is limited. The resistivity images can be combined with other well log measurements to provide further characterization of formation properties. For example, if the porosity of the rock and the connate water resistivity are known, it is possible to estimate the hydrocarbon saturation in the formation.

FIG. 6 shows a log of resistivity (ohm-meters) vs. log depth (meters) as would be recorded by channels H1, H4, H7, H10 and H13 in a formation with thin beds and no invasion. Good agreement between the measured resistivity and the formation resistivity can be seen for be thicknesses as small as 0.3 meters.

FIG. 7 (a) shows a resistivity map of a formation with invaded thin beds. The true bed resistivity and the invasion resitivity are displayed in FIG. 7 (b) in conventoinal resistivity log format. FIG. 7 (c) shows the resistivity logs that would be recorded in this formation be channels H1, H4, H7, H10 and H13. It is seen that at the channles are probing progressively deeper into the formad give an indication of the presence of invasion. With computer processing of the data from all 13 channels, an image of the resistivity distribution is obtained, shown in FIG. 7 (d). The reconstructed image in FIG. 7 (d) exhibits good correspondence with the original resistivity map in FIG. 7 (a). The reconstructed shallow and deep resistivity values, displayed in FIG. 7 (e), are close to the original resistivity logs shown in FIG. 7 (b).

Figure 8A:
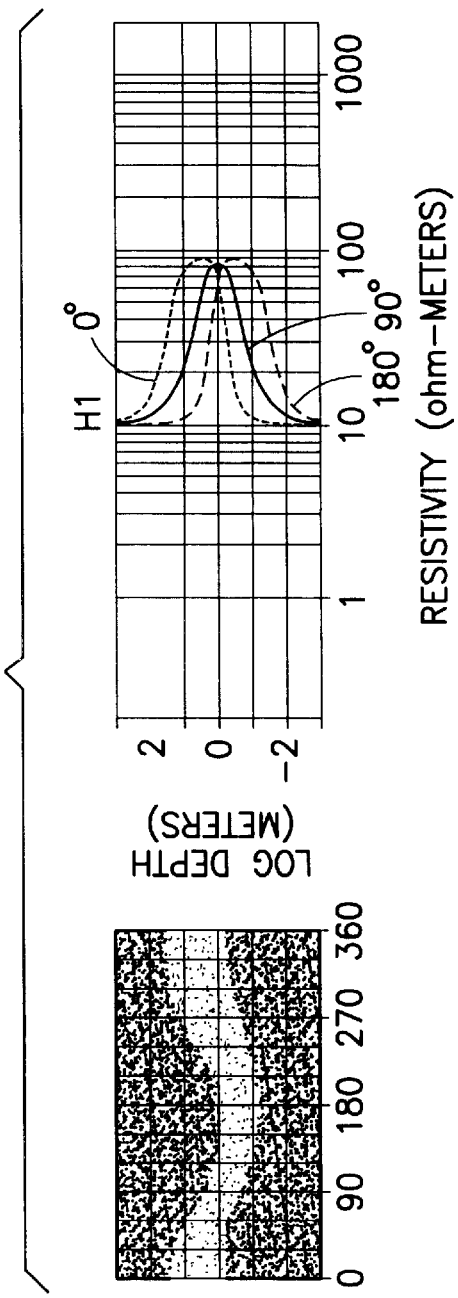
FIGS. 8 (a)–(e) show simulated azimuthal resistivity images of a thin bed as would be recorded by five channels of the array laterolog in a deviated well with a dip angle of 60 degrees from the vertical.
Figure 8B:
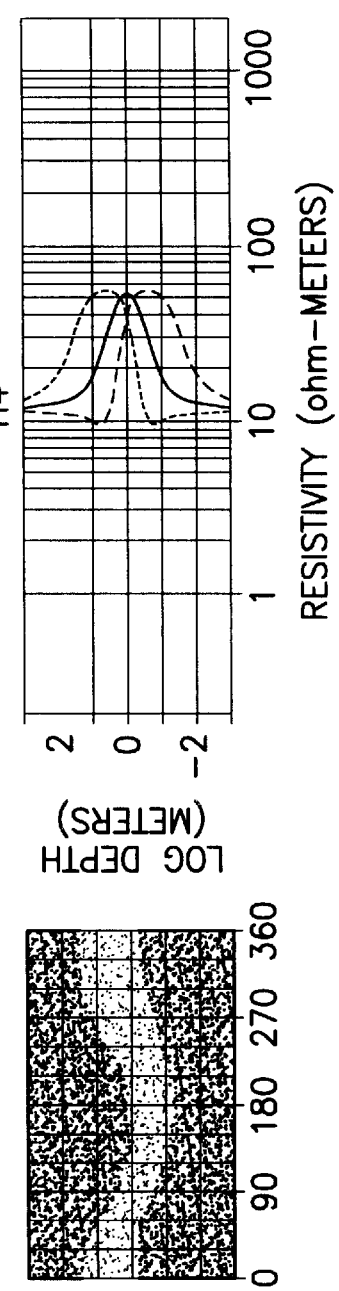
Figures 8C, 8D, 8E:
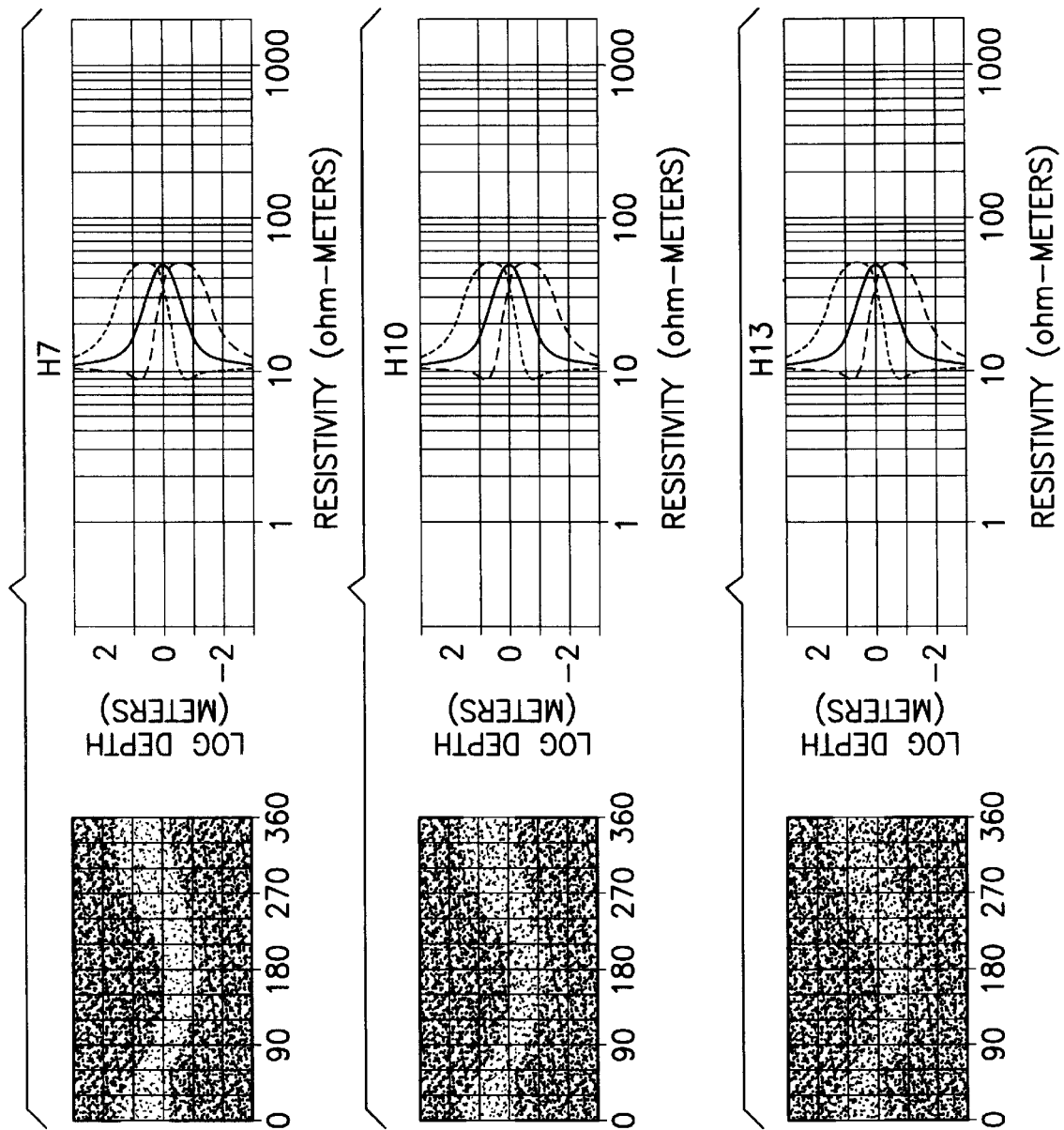

Using the azimuthal discrimination available with the tool descibed above, it is possible to determine the azimuthal distibution of resistivity at different depths into the formation which can be particularly useful for identifying dipping beds. FIGS. 8 (a)–(e) show the azimuthal resistivity measurements made at positions 0°, 90° and 180° around the borehole for the five channels considered previously in the presence of a 60° dipping bed and the corresponding recorded image around the borehole rendered in gray scale. This ability can also be used to identify and characterize fractures around the borehole.

I claim:

1. Apparatus for determining the resistivity of an underground formation, comprising:
   (a) a tool body;
   (b) a current electrode for emitting current into the formation, disposed on the tool body;
   (c) means for exciting the current electrode to a predetermined voltage;
   (d) a series of pairs of electrodes, disposed on the tool body, on either side of the current electrode;
   (e) means for exciting at least one pair of voltage electrodes at the predetermined voltage, and at a frequency selected according to the distance of said pair of electrodes from the current electrode, so as to focus the current into the formation;
   (f) means for measuring the current; and,
   (g) means for determining the resistivity of the formation from the measured current.

2. Apparatus as claimed in claim 1, wherein the frequency is selected to be higher when the voltage electrodes are closer to the current electrode and lower when the voltage electrodes are further from the current electrode.

3. Apparatus as claimed in claim 1, wherein the frequency is in the range of about 1000 Hz to about 4000 Hz.

4. Apparatus as claimed in claim 1, wherein thirteen pairs of voltage electrodes are provided.

5. Apparatus as claimed in claim 4, wherein an excitation signal is applied to a first seven pairs of voltage electrodes having a frequency of about 4000 Hz, an excitation signal is applied to a following four pairs of voltage electrodes having a frequency of about 2000 Hz, and an excitation signal is applied to a remaining two pairs of voltage electrodes having a frequency of about 1000 Hz.

6. A method for determining the resistivity of an underground formation, comprising:
   (a) disposing a tool, having a tool body, in a borehole, surrounded by a formation;
   (b) emitting current into the formation from a current electrode, disposed on the tool body;
   (c) exciting the current electrode to a predetermined voltage;
   (d) exciting at least one pair of voltage electrodes, also disposed on the tool body, on either side of the current electrode, to the predetermined voltage, and at a frequency selected according to the distance of said pair of voltage electrodes from the current electrode, so as to focus the current into the formation;
   (e) measuring the current; and,
   (f) determining the resistivity of the formation from the measured current.

7. A method as claimed in claim 6, wherein (d) includes selecting the frequency to be higher when the voltage electrodes are closer to the current electrode and lower when the voltage electrodes are further from the current electrode.

8. A method as claimed in claim 6, wherein, in (d), the frequency is in the range of about 1000 Hz to about 4000 Hz.

9. A method as claimed in claim 6, wherein, in (d), thirteen pairs of voltage electrodes are provided.

10. A method as claimed in claim 9, wherein, in (d), an excitation signal is applied to a first seven pairs of voltage electrodes having a frequency of about 4000 Hz, an excitation signal is applied to a following four pairs of voltage electrodes having a frequency of about 2000 Hz, and an excitation signal is applied to a remaining two pairs of voltage electrodes having a frequency of about 1000 Hz.

* * * * *